2,834,771

GELATIN DERIVATIVES AND THEIR PREPARATION

William A. Mitchell, Lincoln Park, and William C. Seidel, Dumont, N. J., assignors to General Foods Corporation, White Plains, N. Y., a corporation of Delaware No Drawing. Application January 3, 1956
Serial No. 556,796

6 Claims. (Cl. 260—117)

This invention relates to the production of a gelatin derivative.

It has been found that when a gelatin solution is adjusted to an alkaline pH with calcium hydroxide, and carbon dioxide is reacted with this adjusted solution, a gelatin derivative is formed having improved physical properties especially suited for whipping. In the process of the invention, sufficient calcium hydroxide is added to a gelatin solution such as acid or neutral gelatin, to raise its pH to about 9. Neutral gelatin is preferred due to a greater number of carboxyl groups that can react in formation of the derivative. Carbon dioxide is introduced in either gaseous or solid form, the preferred method being to simply bubble carbon dioxide into the reaction mixture.

While it is not definitely determined, it is believed that the derivative produced involves the reaction of carbon dioxide and calcium ions with carboxy and amino groups in the gelatin molecule. For convenience, the gelatin derivative will be referred to as carbamino gelatin.

This gelatin derivative has shown improvements in viscosity and bloom over the unmodified gelatin. As a whipping agent, it produces a larger overrun in a shorter period of whipping time than unmodified gelatin samples. A stable foam is formed which holds its volume and texture. The carbamino gelatin can be used as a whipping agent in the production of any of the edible or inedible foams in which gelatin, or gelatin plus other whipping adjuncts such as hydrolyzed soy protein are employed. Examples of whipping compositions in which this gelatin derivative can be used successfully are marshmallow preparations, chiffon desserts, icings, and sugar whips generally.

The following are examples of the process of the present invention and the use of the product.

EXAMPLE 1

Calcium hydroxide is dispersed in an aqueous solution of neutral 250 bloom gelatin to raise the pH of the solution to about 9. An excess of carbon dioxide gas is then bubbled into the reaction mixture until the mixture is brought down to about pH 7. As the carbon dioxide is bubbled into the reaction mixture, the gelatin derivative of the present invention is formed and calcium carbonate is precipitated. Excess calcium salts (calcium carbonate and calcium hydroxide) are removed by suitable ion exchange resins. The solution containing the derivative is allowed to gel, and then is tunnel dried and ground. The product is more easily dispersed than the unmodified gelatin starting material and is soluble in water at 65° C.

EXAMPLE 2

Carbamino gelatin, substantially soluble in cold water, is prepared according to the following method: 88.9 lbs. of water are weighed out into a jacketed kettle. 11.1 lbs. of 250 bloom gelatin are added to the cold water with agitation, and the gelatin dispersion is heated to 40–45° C. to dissolve the gelatin. Calcium hydroxide is added to the hot gelatin solution until the pH is raised to between 9.5 and 10.0. Carbon dioxide is then bubbled through the gelatin solution for 15 minutes while the pH of the solution is maintained between 9.5 and 10.0 by the addition of calcium hydroxide. The reaction mixture is filtered to remove undissolved lime and calcium carbonate and is placed back into the jacketed kettle with Rohm and Haas IR45 and IR120 mixed ion exchange resin to remove extraneous anions and cations. After the mixture has been stirred for 15–20 minutes to allow the ion exchange resin to react and a constant pH of about 5 is reached, the solution is filtered again to remove the ion exchange material. The product solution is then dried in the sol state by drying on a double drum drier, although any method of drying the gelatin derivatives whereby the sol state is preserved during dehydration is acceptable. The dried product is ground in a Fitzpatrick mill. The dried product is soluble in relatively cold water (15–25° C.).

EXAMPLE 3

*White sugar icing mix*

PACKAGE 1

| | Gms. |
|---|---|
| Sucrose | 39.7 |
| Methyl cellulose (Methocel) | 1.5 |
| Sol dried carbamino gelatin of Example 2 | 4.0 |

PACKAGE 2

| | |
|---|---|
| Sucrose | 242.0 |
| Pregelatinized potato starch | 10.8 |
| Ethyl vanillin | 0.8 |

Package 1 is dissolved in 180 ml. of cool tap water (20° C.) and whipped in a Sunbeam Mixmaster at high speed for four minutes to a foam having stiff peaks. Then package 2 is folded into the foam with mild mixing in the mechanical beater. When all of package 2 is added, the mixture is whipped at high speed for one minute. The product has a volume of about 4 standard measuring cups, a smooth creamy texture with a firm body and a high gloss. When the icing is spread on a cake, it is found to retain its original texture, body and gloss without syneresis for a period over 72 hours.

EXAMPLE 4

The gel dried product of the process in Example 1 is substituted in the mix formula in Example 3 for the sol dried carbamino gelatin. An icing substantially the same as that produced in Example 3 can be obtained following the same recipe except that package 1 is dissolved in 65° C. water to dissolve the carbamino gelatin, after which the solution is cooled to room temperature and whipped as in Example 3.

EXAMPLE 5

*Marshmallow*

190 gms. of cane syrup and 800 gms. of sucrose are added to 388 ml. of tap water and the mixture is heated to 100° C. 15.4 gms. of carbamino gelatin prepared according to the process in Example 1 from 240 bloom neutral gelatin are added to 100 ml. of tap water heated to 65° C. The two mixtures are combined and cooled to 60° C. and beaten in a Hobart mixer. After 21 minutes of beating, a marshmallow having an overrun of 300% and substantially free of syneresis is produced. This is a significant improvement over the overrun produced by employing unmodified gelatin in marshmallow, the best of which is pigskin gelatin providing an overrun of 288% under comparable conditions. Normally neutral gelatin does not possess as high an overrun in marshmallow as pigskin gelatin but when modified in accordance with the present invention, it surpasses the performance of all types of unmodified gelatin.

It will be understood that while the invention has been described in part by means of specific examples reference should be had to the appended claims for a definition of the scope of the invention.

What is claimed is:

1. The method of preparing a gelatin derivative which comprises adjusting a gelatin solution to an alkaline pH by means of calcium hydroxide, and reacting carbon dioxide therewith.

2. The gelatin derivative prepared according to claim 1.

3. The method of preparing a gelatin derivative which comprises adjusting a gelatin solution to a pH of about 9 by means of calcium hydroxide, and reacting carbon dioxide therewith.

4. The method of preparing a gelatin derivative which comprises adjusting a gelatin solution to a pH of about 9 by means of calcium hydroxide, and reacting carbon dioxide gas therewith.

5. The method of preparing a gelatin derivative which comprises adjusting a gelatin solution to an alkaline pH by means of calcium hydroxide, reacting carbon dioxide therewith, and drying the resulting solution while maintaining it in the sol state.

6. The method of preparing a gelatin derivative which comprises adjusting a gelatin solution to an alkaline pH, by means of calcium hydroxide, and reacting an excess of carbon dioxide therewith.

References Cited in the file of this patent

UNITED STATES PATENTS

| | | |
|---|---|---|
| 1,993,289 | Stokes et al. | Mar. 5, 1935 |
| 2,158,117 | Grettie | May 16, 1939 |
| 2,392,297 | Strenitz | Jan. 1, 1946 |